(12) United States Patent
Consolazio

(10) Patent No.: US 7,146,136 B2
(45) Date of Patent: Dec. 5, 2006

(54) E-BAND RADIO TRANSCEIVER ARCHITECTURE AND CHIP SET

(75) Inventor: Stephen James Consolazio, Palatine, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 427 days.

(21) Appl. No.: 10/772,050

(22) Filed: Feb. 4, 2004

(65) Prior Publication Data
US 2005/0170789 A1    Aug. 4, 2005

(51) Int. Cl.
*H04B 1/28* (2006.01)
*H04M 1/00* (2006.01)

(52) U.S. Cl. .................. 455/73; 455/333; 455/550.1

(58) Field of Classification Search ............... 455/41.2, 455/73, 78, 333, 334, 550.1
See application file for complete search history.

(56) References Cited

U.S. PATENT DOCUMENTS

| | | | |
|---|---|---|---|
| 4,109,247 A | 8/1978 | Kaplan | |
| 4,724,427 A | 2/1988 | Carroll | |
| 4,746,830 A | 5/1988 | Holland | |
| 4,885,571 A | 12/1989 | Pauley et al. | |
| 4,897,642 A | 1/1990 | DiLullo et al. | |
| 4,952,913 A | 8/1990 | Pauley et al. | |
| 4,952,928 A | 8/1990 | Carroll et al. | |
| 5,014,206 A | 5/1991 | Scribner et al. | |
| 5,051,741 A | 9/1991 | Wesby | |
| 5,266,944 A | 11/1993 | Carroll et al. | |
| 5,396,277 A | 3/1995 | Gast et al. | |
| 5,486,830 A | 1/1996 | Axline, Jr. et al. | |
| 5,512,902 A | 4/1996 | Guthrie et al. | |
| 5,525,993 A | 6/1996 | Pobanz et al. | |
| 5,565,858 A | 10/1996 | Guthrie | |
| 5,602,538 A | 2/1997 | Orthmann et al. | |
| 5,627,517 A | 5/1997 | Theimer et al. | |
| 5,629,691 A | 5/1997 | Jain | |

(Continued)

OTHER PUBLICATIONS

Hamamatsu InGaAs Pin Photodiode Oct. 2001, Japan.

*Primary Examiner*—Simon Nguyen
(74) *Attorney, Agent, or Firm*—Stetina Brunda Garred & Brucker

(57) ABSTRACT

A GaAs E-Band transceiver front-end chip set is provided comprising three MMIC devices. The first device includes a circuit for receiving data at baseband, mixing the data with an LO signal having an E-Band frequency, and transmitting a resultant data stream at an upconverted E-Band frequency; a circuit for receiving data having an E-Band frequency, mixing the received data with an LO signal having an E-Band frequency, and downconverting the resultant mixed received signal to an IF; and a circuit for dividing a received LO signal at an E-Band frequency and communicating the LO signal to the transmission and receiver circuits. The second device comprises a circuit for receiving an LO signal at a reference frequency, and multiplying the LO signal to an E-Band frequency. The third device comprises a circuit for mixing the mixed received IF signal with an LO signal, and downconverting the resultant mixed received signal to a baseband frequency, and a circuit for generating an LO signal, communicating the LO signal to the second device, coupling the LO signal, dividing the coupled LO signal, and communicating the divided LO signal to the second downconversion circuit. The first and second devices may be manufactured by a p-HEMT process and the third device is manufactured by a MESFET process. Additionally, an E-Band communications system is provided which utilizes the aforementioned chip set.

63 Claims, 5 Drawing Sheets

U.S. PATENT DOCUMENTS

| | | |
|---|---|---|
| 5,629,981 A | 5/1997 | Nerlikar |
| 5,640,151 A | 6/1997 | Reis et al. |
| 5,666,647 A | 9/1997 | Maine |
| 5,686,902 A | 11/1997 | Reis et al. |
| 5,712,899 A | 1/1998 | Pace, II |
| 5,751,246 A | 5/1998 | Hertel |
| 5,774,876 A | 6/1998 | Woolley et al. |
| 5,798,693 A | 8/1998 | Engellenner |
| 5,804,810 A | 9/1998 | Woolley et al. |
| 5,822,683 A | 10/1998 | Paschen |
| 5,831,519 A | 11/1998 | Pedersen et al. |
| 5,856,788 A | 1/1999 | Walter et al. |
| 5,872,520 A | 2/1999 | Seifert et al. |
| 5,890,068 A | 3/1999 | Fattouche et al. |
| 5,892,441 A | 4/1999 | Woolley et al. |
| 5,894,266 A | 4/1999 | Wood, Jr. et al. |
| 6,049,278 A | 4/2000 | Guthrie et al. |
| 6,329,944 B1 | 12/2001 | Richardson et al. |
| 6,473,598 B1 * | 10/2002 | Sepehry-Fard ............... 455/73 |
| 6,556,836 B1 * | 4/2003 | Lovberg et al. ............. 455/505 |
| 6,573,808 B1 * | 6/2003 | Burin ......................... 333/132 |
| 6,700,531 B1 * | 3/2004 | Abou-Jaoude et al. ...... 342/165 |
| 6,972,709 B1 * | 12/2005 | Deem et al. ................... 342/70 |
| 2002/0176139 A1 * | 11/2002 | Slaughter et al. ........... 359/172 |
| 2003/0027530 A1 * | 2/2003 | Levitt et al. .................. 455/73 |
| 2004/0203528 A1 * | 10/2004 | Ammar et al. ............. 455/90.3 |
| 2005/0124307 A1 * | 6/2005 | Ammar et al. ........... 455/183.2 |

* cited by examiner

E-BAND RADIO TRANSCEIVER ARCHITECTURE AND CHIP SET

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to radio front-end transceiver architecture and packaging. In particular, the present invention relates to a gallium arsenide (GaAs) MMIC-based front-end transceiver integrated chip set for E-Band applications.

2. Background of the Invention

The present application is directed to "millimeter wave" frequencies which generally comprise frequencies above 40 GHz. In particular, there has been a tremendous interest in utilizing the E-Band portion of the electromagnetic spectrum because of the inherently wide bandwidth available in the E-band frequency range.

E-Band (also sometimes referred to as W-Band) is defined by the FCC as frequency ranges 71–76 GHz, 81–86 GHz and 92–95 GHz. The FCC has set aside E-band primarily for commercial use. By operating at millimeter wave frequencies, digital radios gain access to large blocks of bandwidth that can support emerging high-data rates and multiple-access markets. Some, industry proponents foresee using millimeter frequencies as a means of overcoming the "last mile" bottleneck that hampers broadband usage.

Practical applications of millimeter wave technologies can be generally categorized into two basic categories: (1) communications (point-to-point, point-to-multipoint, local multipoint distribution systems, indoor communications, wireless local area networks), and (2) automotive radar, industrial sensors, and imaging. There are also some DoD military applications which utilize E-band.

In today's world of miniaturization, there is an ever-increasing industry pressure to reduce the size and cost of E-band communication chip sets. This pressure has driven designers to develop E-band transceivers with higher levels of integration. Achieving the goal of maximum integration is not as trivial as replacing external components with on-chip components. Instead, it typically requires a reconfiguration of the front-end design. And since E-Band transceiver front-ends are considered key elements in the expanding millimeter wave based communications technologies, efforts are being directed toward making E-band transceivers smaller, lighter, more power efficient, and less expensive. This has resulted in new E-Band front-end architectures with fewer off-chip components.

A disadvantage of the current known prior art methods of designing and integrating more compact E-Band chip sets is that most suppliers of MMIC devices to the microelectronics industry, develop chip sets to be very flexible so as to fit a wide variety of applications and architectures. The chip suppliers do this by developing chip sets comprised of several single-function chips or sometimes a couple of functions per chip. For example, an existing commercially available V-Band (60 GHz) chip set consists of five or six single function devices. By using this approach, the subsystem architect can combine the "discrete" circuit functions appropriately to form a receiver or transmitter. Although this approach has flexibility, it also adds part count, manufacturing costs and can compromise performance, especially in the upper millimeter wave (mmw) bands.

A key to bringing E-Band based products to the market place is a low cost, repeatable, mass producible means of realizing the transceiver electronics. Currently, there are several packaging technologies which are currently being utilized to implement E-band applications, including: flip chip, MMIC, and coplanar technology.

Of the aforementioned technologies, MMIC technology is a leading choice because it greatly reduces component count, it lowers bill of materials cost, it lowers the cost of manufacturing/part placement, and it is easy to integrate into systems. Moreover, MMIC technology allows for repeatable testing processes, tight performance tolerances, it is physically smaller in size, and easy to implement advanced architectures.

It would be desirable to provide a highly integrated MMIC-based front-end transceiver integrated chip set for E-Band applications which is a high yield, repeatable MMIC chipset, compact in size and economical to manufacture. If such an E-Band chip set could be produced, the benefits of broadband technology would become more easily realized.

BRIEF SUMMARY OF THE INVENTION

According to an exemplary embodiment of the present invention, a MMIC-based radio front-end architecture in E-Band is disclosed which provides high performance in a cost effective solution for a broad range of applications.

In particular, a gallium arsenide (GaAs) MMIC-based transceiver integrated chip set is provided for E-Band applications comprising three very highly integrated monolithic microwave integrated circuit (MMIC) devices. In a preferred embodiment two of the devices are fabricated in a pseudo-morphic high electron mobility transistor (p-HEMT) process and one of the devices is fabricated in an ion-implanted MESFET device to reduce the cost of the overall chip set in volume applications. In another embodiment all three devices utilize the p-HEMT process to keep the chip set common to a single process technology. Since the chip set is highly integrated, many of the aforementioned disadvantages of the known prior art E-Band chip sets are overcome. In particular, since the present invention E-band front-end transceiver chip set is specifically designed and optimized with respect to manufacturing the most compact upper millimeter wave transceiver chip set possible, part count and manufacturing costs are reduced, while performance is maximized. As a result, the present invention makes up one of the most compact upper millimeter wave transceiver chip sets in the industry.

The incorporation of filtering in monolithic media has uniqueness in that it is not normally combined on the integrated circuit itself, but often times realized in other thin film or discrete circuit media, which adds complexity and consumes circuit area. With the present invention, the filtering is partially combined into the matching networks of associated amplifier stages to form "bandpass" amplifiers. The generation of the LO signal and conversion from the first intermediate frequency to baseband can be realized using a lower cost, higher yield, ion-implanted GaAs metal semiconductor field effect transistor (MESFET) process.

This is unique because most millimeter wave chip sets are fabricated strictly in a more costly epitaxial type HEMT process.

According to the present invention, a MMIC-based E-Band transceiver front-end is provided having three MMIC devices. The first MMIC device comprises a transmission circuit for receiving a data stream input at a baseband frequency, mixing the data stream with an LO signal having an E-Band frequency, and transmitting a resultant data stream at an upconverted E-Band frequency. The first MMIC device further includes a receiver circuit for receiving a data stream having an E-Band frequency, mixing the received data stream with an LO signal having an E-Band frequency, and downconverting the resultant mixed received signal to an intermediate frequency (IF). The first MMIC device also includes an LO signal circuit for dividing a received LO signal at an E-Band frequency and communicating the LO signal to the transmission and receiver circuits.

The second MMIC device comprises a multiplier circuit for receiving an LO signal at a reference frequency, and multiplying the LO signal to an E-Band frequency.

The third MMIC device comprises a second downconversion circuit for mixing the mixed received IF signal with an LO signal, and downconverting the resultant mixed received signal to a baseband frequency, and an LO generation circuit for generating an LO signal, communicating the LO signal to the second MMIC device, coupling the LO signal, dividing the coupled LO signal, and communicating the divided LO signal to the second downconversion circuit.

According to another aspect of the present invention the first, second, and third MMIC devices are manufactured by a p-HEMT process. In other aspects of the present invention, the first and second MMIC devices are manufactured by a p-HEMT process and the third MMIC device is manufactured by a MESFET process. Moreover, the transceiver front-end transmits and receives over three frequency ranges including 71–76 GHz, 81–86 GHz and 92–95 GHz. According to still other aspects of the present invention, the transceiver front-end transmits and receives over four 1.25 GHz channels within each of the 71–76 GHz, 81–86 GHz, and 92–95 frequency ranges. According to other aspects of the present invention, the MMIC devices are gallium arsenide (GaAs) devices.

Furthermore, according to another aspect of the present invention, the transceiver front-end is adapted to communicate with another transceiver front-end in a full-duplex scheme. According to another aspect of the present invention, the transmission circuit includes a fundamental mixer and at least one amplifier downstream of said mixer. According to yet another aspect of the present invention, the receiving circuit includes a low noise amplifier, a bandpass filter downstream said low noise amplifier, and a fundamental mixer downstream said low noise amplifier.

Moreover, in another aspect of the present invention, the LO signal circuit comprises a power divider and at least one amplifier downstream each output of the divider. According to yet another aspect of the present invention, the multiplier circuit comprises an X2 multiplier, a first bandpass filter downstream said X2 multiplier, a circuit amplifier downstream the first bandpass filter, a X4 multiplier downstream of the multiplier circuit amplifier, and a multiplier circuit bandpass filter downstream of the X4 multiplier. According to further aspects of the present invention, the second downconversion circuit comprises at least one amplifier, a low pass filter downstream of the at least one amplifier, and a mixer downstream of the low pass filter. In another aspect of the present invention, the LO generation circuit comprises an oscillator, at least one buffering amplifier downstream the oscillator, a coupler between the oscillator and the at least one buffering amplifier, a power divider downstream of the coupler, and a second amplifier downstream an output of the power divider.

Further aspects of the present invention include utilizing a sub-harmonic mixing scheme is utilized wherein the transmission circuit and the receiver circuit each utilize singly balanced sub-harmonic mixers. Moreover, in the sub-harmonic mixing scheme, the multiplier circuit comprises a circuit amplifier, a X4 multiplier downstream of the multiplier circuit amplifier, and a multiplier circuit bandpass filter downstream of said X4 multiplier.

According to another embodiment of the present invention, a E-Band transceiver front-end is provided which comprises three MMIC devices. The first MMIC device includes a transmission circuit comprising a fundamental transmission mixer, at least one transmission amplifier downstream said transmission mixer, wherein a data steam is input into the transmission mixer, and wherein an output from the at least one amplifier is transmitted. The first MMIC device also includes a receiver circuit comprising a low noise amplifier, a receiver bandpass filter downstream the low noise amplifier, and a fundamental receiver mixer, wherein a received signal is communicated to an input of the low noise amplifier, and wherein an output of the receiver mixer is communicated to a third MMIC device. The first MMIC device also includes an LO signal circuit comprising a power divider, a transmission LO amplifier in communication with a first output of the power divider, and a receiver LO amplifier in communication with a second output of the power divider, wherein an output of said transmission LO amplifier is communicated to an input of the transmission mixer, and an output of the receiver LO amplifier is communicated to an input of the receiver mixer.

The second MMIC device includes a multiplier circuit comprising an X2 multiplier, a first multiplier circuit bandpass filter downstream of the X2 multiplier, a multiplier circuit amplifier downstream of the first multiplier circuit bandpass filter, a X4 multiplier downstream of multiplier circuit amplifier, and a second multiplier circuit bandpass filter downstream of the X4 multiplier, wherein an output of the X4 multiplier is communicated to an input of the power divider of the first MMIC device.

The third MMIC device includes an IF circuit comprising an IF amplifier, a low pass filter downstream of the IF amplifier, and a baseband mixer downstream of the low pass filter, wherein an output of the receiver mixer from the first MMIC device is communicated to an input of the IF amplifier, and wherein the baseband mixer provides an output data stream. The third device also includes an LO generation circuit comprising a fixed tuned oscillator, a first buffering amplifier downstream of the fixed tuned oscillator, a coupler between the fixed tuned oscillator and the first buffering amplifier, a third MMIC device power divider downstream of the coupler, and a second buffering amplifier downstream of a first output of the third MMIC device power divider, wherein an output from the first buffering amplifier is communicated to an input of the X2 multiplier of the second MMIC device.

According to another aspect of the present invention, the E-Band transceiver front-end, further includes a phase lock loop circuit comprising a X1/8 multiplier, a phase lock loop device downstream of the X1/8 multiplier, and a reference signal oscillator which supplies a reference signal to an input of the phase lock loop device, wherein an output of the phase lock loop device is in communication with an input of the fixed tune oscillator of the third MMIC device, and wherein the X1/8 multiplier is in communication with a second output of the third device power divider from the third MMIC device.

In another embodiment of the present invention, a MMIC-based E-Band transceiver front-end, which comprising three MMIC devices, is provided having a sub-harmonic transmission mixing scheme. The first MMIC device includes a transmission circuit comprising a sub-harmonic transmission mixer, at least one transmission amplifier downstream the transmission mixer, wherein a data steam is input into the transmission mixer, and wherein an output from the at least one amplifier is transmitted. The first MMIC device also includes a receiver circuit comprising a low noise amplifier, a receiver bandpass filter downstream the low noise amplifier, and a sub-harmonic receiver mixer, wherein a received signal is communicated to an input of the low noise amplifier, and wherein an output of the receiver mixer is communicated to a third MMIC device. The first MMIC device also includes an LO signal circuit comprising a power divider, a transmission LO amplifier in communication with a first output of the power divider, and a receiver LO amplifier in communication with a second output of the power divider, wherein an output of the transmission LO amplifier is communicated to an input of the transmission mixer, and an output of the receiver LO amplifier is communicated to an input of the receiver mixer.

The second MMIC device includes a multiplier circuit comprising a multiplier circuit amplifier, a X4 multiplier downstream of said multiplier circuit amplifier, and a multiplier circuit bandpass filter downstream of the X4 multiplier, wherein an output of the multiplier circuit bandpass filter is communicated to an input of the power divider of the first MMIC device.

In another embodiment of the present invention, an E-Band transceiver front-end is provided consisting of a first and second MMIC device. The first MMIC device consists of a transmission circuit consisting of a sub-harmonic transmission mixer, and a transmission amplifier downstream the transmission mixer, wherein a data steam is input into the transmission mixer, and wherein an output from the at least one amplifier is transmitted. The first MMIC device also includes a receiver circuit consisting of a low noise amplifier, a receiver bandpass filter downstream the low noise amplifier, and a sub-harmonic receiver mixer, wherein a received signal is communicated to an input of the low noise amplifier, and wherein an output of the receiver mixer is communicated to a second MMIC device. The first MMIC device also includes an LO signal circuit consisting of a power divider, a transmission LO amplifier in communication with a first output of the power divider, and a receiver LO amplifier in communication with a second output of the power divider, wherein an output of the transmission LO amplifier is communicated to an input of said transmission mixer, and an output of the receiver LO amplifier is communicated to an input of the receiver mixer.

The second MMIC device includes a multiplier circuit consisting of a first buffering amplifier, an X4 multiplier downstream of the first buffering amplifier, and a multiplier circuit bandpass filter downstream of the X4 multiplier, wherein an output of the multiplier circuit bandpass filter is communicated to an input of the power divider of the first MMIC device. The second MMIC device also includes an IF circuit consisting of an IF amplifier, a low pass filter downstream of the IF amplifier, and a baseband mixer downstream of the low pass filter, wherein an output of the receiver mixer from the first MMIC device is communicated to an input of the IF amplifier, and wherein the baseband mixer provides an output data stream. The second device also includes an LO generation circuit consisting of a fixed tuned oscillator having an output in communication with an input of the first buffering amplifier of the multiplier circuit, a coupler between the fixed tuned oscillator and the first buffering amplifier, a second MMIC device power divider downstream of the coupler, and a second buffering amplifier downstream of a first output of the second MMIC device power divider. According to another aspect of the present invention, the first and second MMIC devices are manufactured by a p-HEMT process.

According to yet another embodiment of the present invention, an E-Band communications system is provided. The E-Band communications system comprises a plurality of E-Band stations adapted to communicate with each other. Each station comprises a MMIC-based E-Band transceiver front-end, a modem, baseband equipment, and a data source. And, according to another aspect of the present invention, the E-Band communications system utilizes a point-to-point topology.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

It is initially noted that the exemplary embodiment described herein is presented in a simplified schematic manner. The particulars shown herein are by way of example and for purposes of illustrative discussion of one of many possible embodiments of the present invention and are presented in the cause of providing what is believed to be the most useful and readily understood description of the principles and conceptual aspects of the present invention. In this regard, no attempt is made to show structural details of the present invention in more detail than is necessary for the fundamental understanding of the present invention. The description in view of the drawings makes apparent to those skilled in the art how the several forms of the present invention may be embodied in practice.

Overview of the Present Invention

The present invention is a MMIC-based radio front-end and architecture thereof for E-Band applications. In particular, one embodiment of the present invention is a gallium arsenide (GaAs) MMIC-based transceiver front-end integrated chip set which conceptually comprises three highly integrated monolithic chips (MMIC), including two p-HEMT devices and one ion-implanted MESFET device. Another embodiment of the present invention includes a gallium arsenide (GaAs) MMIC-based transceiver front-end integrated chip set which conceptually comprises two highly integrated monolithic chips (MMIC), including two p-HEMT devices.

The present invention's architecture is scalable to extend frequency band coverage (or channel selection) by adjusting the frequency of a fixed-tuned local oscillator. This allows for simplification of the local oscillator generation circuitry. A first intermediate frequency (IF) in the X-Band (8–12 GHz) range is chosen since the receiver and transmitter bands are separated by 10 GHz. A single conversion transmitter section is used to simplify the transmitter along with a double conversion receiver section.

The chip set and architecture thereof the present invention may contain up to ten different circuit functions on a single chip, and yet remains flexible enough to be configured in a manner to cover the entire E-Band (71–76 GHz, 81–86 GHz and 92–95 GHz) by shifting the local oscillator (LO) frequency, adjusting the intermediate frequency (IF) and changing the frequency coverage of the transmit output amplifiers and low noise amplifier (LNA).

First Exemplary Embodiment of the Present Invention

Figure 1:
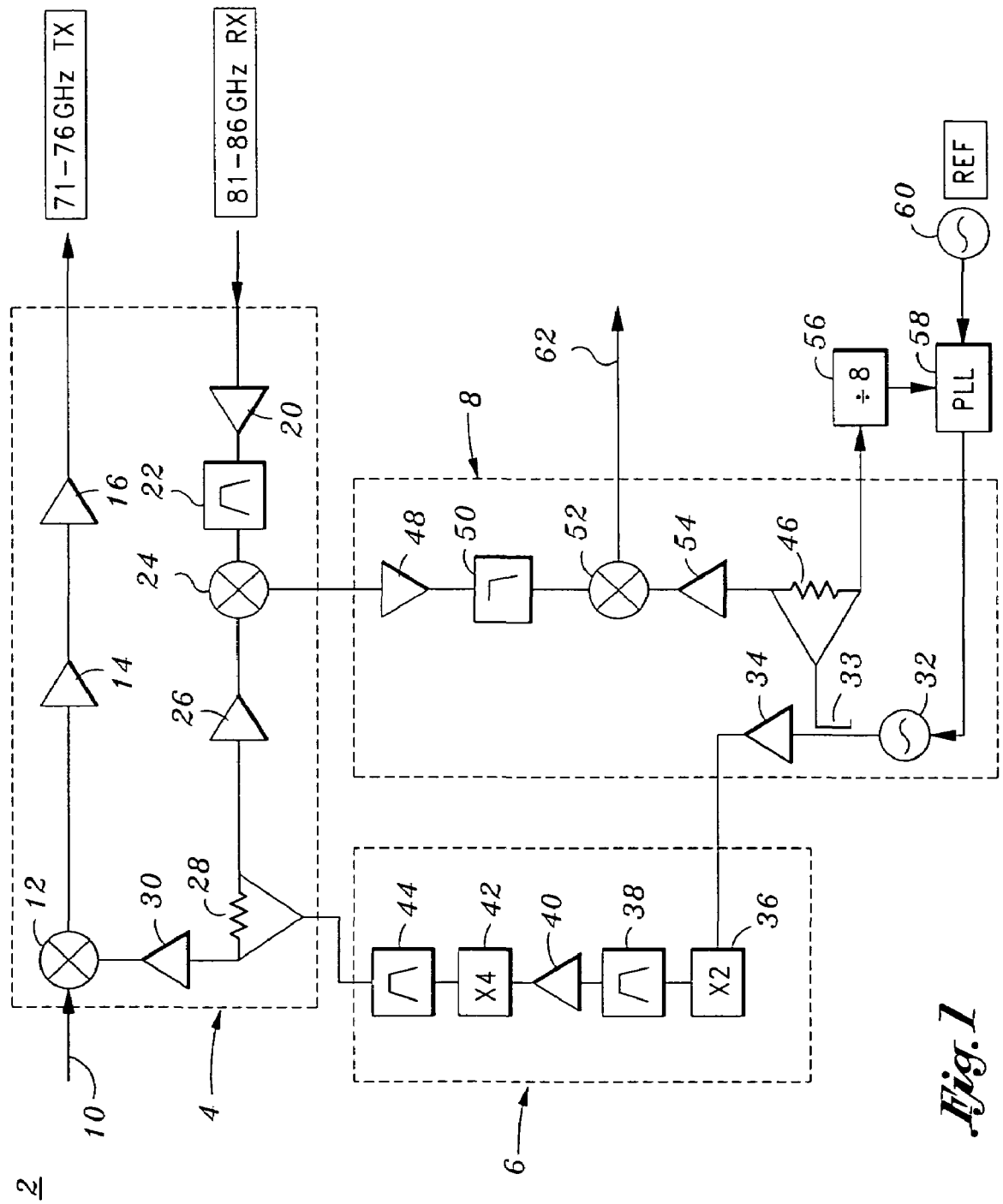
FIG. 1 is a circuit diagram of a first exemplary E-Band radio transceiver front-end, according to an aspect of the present invention.

According to a first exemplary embodiment of the present invention, a MMIC-based radio front-end and architecture thereof for E-Band applications which comprises a chip set including three MMIC devices, 6, 8, 10 is disclosed as the circuit depicted in FIG. 1. Unique to the first embodiment of the present invention is a fundamental up and down converter mixing scheme. Each MMIC device 6, 8, 10 is now herein described below.

First MMIC Device: Transmitter and Receiver Chip

A first exemplary MMIC device 4 is [also referred to as the transmitter (TX) and receiver (RX) chip] is provided which includes as many as nine circuit functions on a single chip, including a fundamental mixer 12 (or modulator), transmission amplifier 14, transmission amplifier 16, amplifier 20, bandpass filter 22, fundamental mixer 24 (or modulator), amplifier 26, power divider 28, and amplifier 30. The MMIC device 4 has three circuits, including a transmission circuit (12, 14, 16), a receiver circuit (20, 22, 24), and a local oscillator (LO) circuit (26, 28, 30).

The transmitter section includes the fundamental mixer 12, and transmission amplifiers 14, 16. With regard to the transmission function, input data signals from a source 10, such as modem, are received into the mixer 12. Additionally, a LO signal a raised to the desired E-Band transmission frequency (for instance between 71–76 GHz) is received into the mixer 12. The mixer 12 then upconverts the modulated baseband signal directly to E-Band. The modulated E-Band signal power is preferably boosted in a chain (or plurality) of transmission amplifiers 14, 16 having nominally about 100 mW (or about +20 dBm) of continuous wave (CW) output power. In particular, transmission amplifier 14 recovers loss from the fundamental mixer 12 and establishes enough RF drive power to obtain power output from the transmission amplifier 16 at about a nominal range between +17 dBm to +20 dBm. It is appreciated that instead of utilizing a chain (or plurality) of transmission amplifiers 14, 16, that an individual transmission amplifier 18 (e.g., see FIG. 3) may also accomplish the same amplification function. After amplification, the signal may be then transmitted in at least one of the four separate 1.25 GHz channels defined between 71–76 GHz.

The receiver circuit (or receiver chain) include a low noise amplifier (LNA) 20, band pass filter 22, and fundamental mixer 24. With regard to the receiver function, signals are initially received over at least one of the four separate 1.25 GHz channels defined between frequency range 81–86 GHz. In receiving the corresponding band, low noise amplifier 20 and band pass filter 22 add selective gain and reduce image noise from the received signal before it is routed into the mixer 24. Furthermore, the LNA 20 sets noise figure for the receiving chain, provides selectivity, and increases sensitivity as well. Moreover, LNA 20 helps to isolate LO from the antenna (not shown).

The LO circuit includes power divider 28, and amplifiers 26, 30. A local oscillator signal raised to the desired E-Band frequency is received into the power divider 28 and then split. The power divider 28 preferably is a Wilkenson-type power divider. Amplifier 30, which is downstream one output of the power divider 28, receives an LO signal at about −10 dBm and amplifies the LO signal to a nominal range of about +10 to +15 dBm. After amplification in amplifier 30, the split LO signal is fed into the fundamental mixer 12 to where the modulated baseband signal is upconverted directly to E-Band. Additionally, amplifier 26, which is downstream the other output of the power divider 28, receives an LO signal at about −10 dBm and amplifies the LO signal to a nominal range of about +10 to +15 dBm. After amplification in amplifier 26, fundamental mixer 24 performs downconversion to an intermediate frequency (IF) separated by about 10 GHz from the transmission signal. It is further appreciated that the amplification function performed by either amplifier 30 and/or amplifier 26 may also be accomplished with a chain or plurality of amplifiers (such as a pair).

Second MMIC Device: Multiplier Chain Chip

The second MMIC device 6 which functions as a multiplier chain may include up to five circuit functions in a single chip, including an X2 multiplier 36, bandpass filter 38, amplifier 40, X4 multiplier 42, and bandpass filter 44. The function of the second MMIC device 6 is to multiply the local oscillator signal to the desired frequency in E-Band, which is then routed to the power divider 28 where the signal is split to drive both the transmitter and receiver circuits of the first MMIC device 4. In particular, an LO signal generated from amplifier 34 of the third MMIC device 8 is received by the X2 multiplier 36 at about a power level that is sufficient enough to drive the X2 multiplier 36. Preferably, the power of the signal from amplifier 34 is at about a nominal +10 dBm. The LO signal is first multiplied by a factor of two through the X2 multiplier 32. Thus, since the signal is received before the X2 multiplier 36 at about 10 GHz, the signal will be incrementally doubled to about 20 GHz. The LO signal is then filtered in bandpass filter 38, wherein undesired multiplier products of about 10 GHz are removed. Thus, for instance, undesired products of about 10 GHz and 30 GHz may be removed in filter 38. The filtered signal is then amplified at in amplifier 40 to a nominal power level of about +10 dBm. The LO signal is then multiplied by a factor of four through the X4 multiplier 42 where the frequency is raised from about 20 GHz to about a range of about 70–80 GHz which is the desired frequency in E-Band.

Finally, the LO signal is filtered in bandpass filter 44 before the LO signal is sent to the power divider 28 in the first MMIC device 4.

Third MMIC Device: LO Generation and Second Downconversion

The third MMIC device 8 may have eight functions on a single chip including a negative resistance fixed tuned oscillator device 32, a directional coupler 33, buffering amplifier 34, power divider 46, buffering amplifier 54, mixer (or modulator) 52, low pass filter 50, and amplifier 48. It is noted that MESFET process technology may be used to manufacture the third MMIC device 8 to reduce the cost of the overall chip set in volume applications, otherwise, a p-HEMT process may be used to keep the chip set common to a single process technology. The third MMIC device 8 includes an LO generation circuit and a second downconversion circuit (or intermediate frequency IF circuit).

The LO generation circuit includes the fixed tuned local oscillation generation device 32, the directional coupler 33, the power divider 46 and the amplifier 54. The function of the LO generation circuit is to generate and distribute a fundamental signal of about 9.5 GHz which is accomplished by the negative resistance oscillator device 32. In particular, the fixed tune oscillator 32 generates the fundamental signal at about 9.5 GHz ($f_0$=9.5 GHz). It is appreciated that appropriate selection of resonator circuitry in the oscillator 32 will yield a desired fundamental signal for the LO generation covering the entire E-Band. It is further appreciated that the primary LO signal frequency of the present invention may vary from application to application.

After the LO signal is generated in oscillator 32, the LO signal is routed directly to the buffering amplifier 34 (8–12 GHz range) where the LO signal is amplified to about +10 dBm. The signal is then directed to the X2 multiplier 36 in the second MMIC device 6. Moreover, the fundamental signal is coupled from the source (oscillator 32) at directional coupler 33 which is positioned between oscillator 32 and amplifier 34. The coupler 33 samples the main signal and produces a similar signal at a lower power level. The coupler 33 may be implemented via for example, distributed transmission line elements. In an alternative approach, an LO signal may be directly split from the oscillator 32. The LO signal sampled from the fundamental signal generated by oscillator 32 is then fed into a power divider 46 to drive the LO in the second downconversion to baseband. In particular, a first LO signal output from the power divider 46 is fed into buffering amplifier 54 (8–12 GHz range) where it is amplified to a nominal power level about +10 dBm. Also, the second LO signal from the power divider 46 is routed to a phase locked loop circuit (56, 58, 60) to provide a signal for phase locking. The phase locked loop circuit will be discussed later in the specification.

The second downconversion circuit (or IF circuit) includes amplifier 48, the low pass filter 50, and mixer 52. In particular, an intermediate frequency (IF) signal in a range of about 8–12 GHz is received from the fundamental mixer 24 of the first MMIC device 4 to the amplifier 48 where the power of the signal is amplified to a nominal power level about +10 dBm. The received IF signal is then passed through the low pass filter 50 where undesired products, mixer terms and/or LO leakage above the IF band may be filtered out. Then the filtered IF signal, still at 8–12 GHz range, is fed into the mixer 52 and combined with the LO signal output from the buffering amplifier 54. The mixer 52 then downconverts the combined signal to baseband, wherein a resulting output data signal 62 is produced and communicated to another device, such a modem.

Second Exemplary Embodiment of the Present Invention

Figure 2:
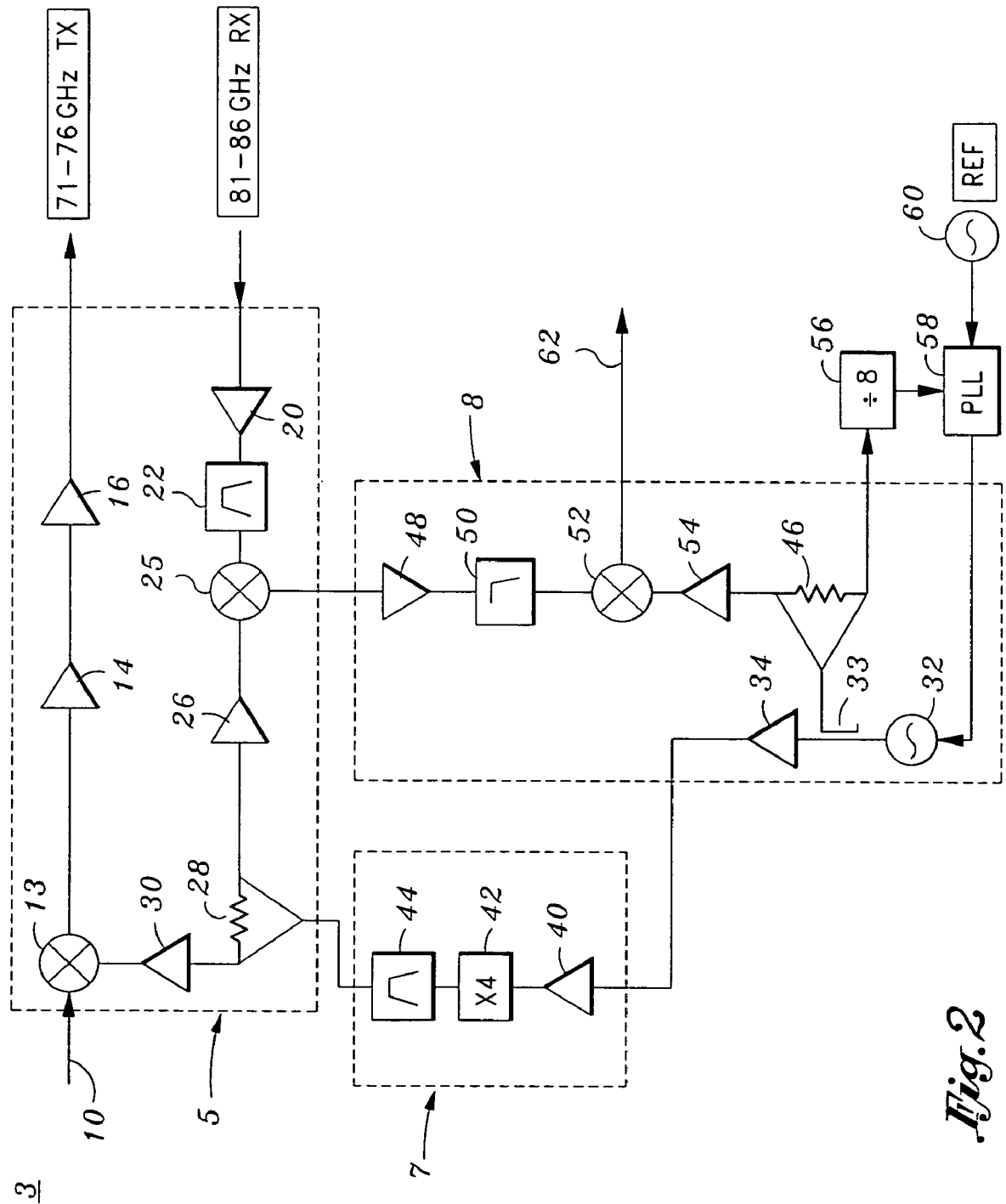
FIG. 2 is a circuit diagram of a second exemplary E-Band radio transceiver front-end, according to an aspect of the present invention.

According to a second exemplary embodiment of the present invention, a MMIC-based radio front-end and architecture thereof for E-Band applications which comprises a chip set 3 including three MMIC devices, 5, 7, 8 is disclosed as the circuit depicted in FIG. 2. The second embodiment of the present invention employs a sub-harmonic mixing scheme by eliminating a multiplier circuit in the multiplier chain chip 7 (or second MMIC device 7), and by furthermore, utilizing singly balanced sub-harmonic mixers in the transmitter and receiver chip 5 (or first MMIC device 5).

In particular, in the second exemplary embodiment of the present invention, the second MMIC device 7 does not include the X2 multiplier 36 or bandpass filter 38. The X2 multiplier 36 and bandpass filter 38 may be omitted to provide a sub-harmonic mixing scheme to be used in mixers 13 and 25 in the first MMIC device 5. Eliminating multiplier 36 simplifies the local oscillator generation chain for applications where a sub-harmonic mix is appropriate. This impacts the frequency coverage of elements amplifier 26, mixer 28, amplifier 30 and bandpass filter 44, but achieving performance at one half of the local oscillator frequency is more easily accomplished, due to the lower frequency. In the second embodiment, the desired transmit and received signals remain in E-Band, but the mixer output terms used internal to the chip are a product involving two times the local oscillator signal (2LO).

A benefit of the second embodiment is that the E-Band transmitter front-end chip set 3 is simplified, it consumes less power, is flexible, is less complex to manufacture, and is less expensive to produce as compared to the E-Band transmitter front-end chip set 2 (from first embodiment; FIG. 1). Each MMIC device 5, 7, 8 is now herein described below.

First MMIC Device (for Second Embodiment): Transmitter and Receiver Chip

An exemplary first MMIC device 5 is [also referred to as the transmitter (TX) and receiver (RX) chip] is provided which includes as many as nine circuit functions on a single chip, including a singly balanced sub-harmonic mixer 13 (or modulator), transmission amplifiers 14, 16, amplifier 20, bandpass filter 22, singularly balanced sub-harmonic mixer 25 (or modulator), amplifier 26, power divider 28, and amplifier 30. The first MMIC device 5 includes three circuits, including a transmission circuit (13, 14, 16), a receiver circuit (20, 22, 25), and a local oscillator (LO) circuit (26, 28, 30).

The transmitter section includes the singly balanced sub-harmonic mixer 13, and transmission amplifiers 14, 16. With regard to the transmission function, input data signal equal to RF+2LO from a source 10, such as modem, is received into the mixer 13. Additionally, an LO signal equal to about half the desired E-Band transmission frequency (for instance between about 35–45 GHz) is received into the mixer 13. The mixer 13 then upconverts the modulated baseband signal RF+2LO directly to a frequency equal to the desired E-Band transmission frequency. The modulated E-Band signal power is preferably boosted in the chain (or plurality) of transmission amplifiers 14, 16 having nominally about 100 mW (or about +20 dBm) of continuous wave (CW) output power. In particular, transmission amplifier 14 recovers loss from the singly balanced sub-harmonic mixer 13 and establishes enough RF drive power to obtain power output from the transmission amplifier 16 at about a nominal range between +17 dBm to +20 dBm. However, it is appreciated that instead of utilizing a chain (or plurality) of transmission amplifiers 14, 16, that an individual amplifier 18 (see FIG. 3) may also accomplish the same amplification function. After amplification, the signal may be then transmitted in at least one of the four separate 1.25 GHz channels defined between 71–76 GHz.

The receiver circuit (or receiver chain) includes a low noise amplifier (LNA) 20, band pass filter 22, and singly balanced sub-harmonic mixer 25. With regard to the receiver function, signals are initially received over at least one of the four separate 1.25 GHz channels defined between frequency range of 81–86 GHz. In receiving the corresponding band, low noise amplifier 20 and band pass filter 22 add selective gain and reduce image noise from the received signal before it is routed into the mixer 25. Furthermore, the LNA 20 sets noise figure (NF) for the receiving chain, provides selectivity, and increases sensitivity as well. Moreover, LNA 20 helps to isolate LO from the antenna (not shown).

The LO circuit includes power divider 28, and amplifiers 26 and 30. It is initially noted that divider 28, and amplifiers 26 and 30 operate at half the desired E-Band frequencies. In particular, an LO signal raised to half the desired E-Band frequency is received into the power divider 28 and split. The power divider 28 preferably is a Wilkenson-type power divider. Amplifier 30, which is downstream one output of the power divider 28, receives an LO signal at about −10 dBm and amplifies the LO signal to a nominal range of about +10 to +15 dBm. After amplification in amplifier 30, the split LO signal is received into the singly balanced sub-harmonic mixer 13 to upconvert the modulated baseband signal RF+2LO directly to a frequency equal to the desired E-Band transmission frequency. Additionally, amplifier 26, which is downstream the other output of the power divider 28, receives an LO signal at about −10 dBm and amplifies the LO signal to a nominal range of about +10 to +15 dBm. After amplification in amplifier 26, singly balanced sub-harmonic mixer 25 then performs downconversion to an intermediate frequency (IF). It is further appreciated that the amplification function performed by either amplifier 30 and/or amplifier 26 may also be accomplished with a chain or plurality of amplifiers (such as a pair).

Second MMIC Device (for Second Embodiment): Multiplier Chain Chip

The second MMIC device 7 which functions as a multiplier chain may include up to three circuit functions in a single chip, including an amplifier 40, X4 multiplier 42, and bandpass filter 44. The function of the second MMIC device 7 is to multiply the local oscillator signal to the half desired frequency in E-Band, which is then routed to the power divider 28 where the signal is split to drive both the transmitter and receiver circuits of the first MMIC device 5. In particular, an LO signal from amplifier 34 of the third MMIC device 8 is received into amplifier 40. Preferably, the power of the signal from amplifier 34 is at about a nominal +10 dBm. The LO signal is received by amplifier 40 and then amplified to a nominal power level of about +10 dBm that is sufficient enough to drive the X4 multiplier 42. It is appreciated that one amplifier, can perform the same function of both buffering amplifier 34 and amplifier 40 in a simpler manner. Once the LO signal is received into the X4 multiplier 42, it is multiplied by a factor of four. Thus, since the signal is received before the X4 multiplier 32 at about 10 GHz, the signal will be incrementally quadrupled to about 40 GHz. The LO signal is then filtered in bandpass filter 44, wherein undesired multiplier products of about 10 GHz are removed. Thus, for instance, undesired products of about 10 GHz, 20 GHz and 30 GHz may be removed in filter 44. Finally, the LO signal is sent to the power divider 28 in the first MMIC device 5.

Third MMIC Device (or Second Embodiment): LO Generation and Second Downconversion The third MMIC device 8 is similar to the first embodiment's MMIC device 8. In particular, it may have eight functions on a single chip including a negative resistance fixed tuned oscillator device 32, a directional coupler 33, buffering amplifier 34, power divider 46, buffering amplifier 54, mixer (or modulator) 52, low pass filter 50, and amplifier 48. It is noted that MESFET process technology may be used to manufacture the third MMIC device 8 to reduce the cost of the overall chip set in volume applications, otherwise a p-HEMT process may be used to keep the chip set common to a single process technology. The third MMIC device 8 includes an LO generation circuit and a second downconversion circuit (or intermediate frequency IF circuit).

The LO generation circuit includes the fixed tuned local oscillation generation device 32, the directional coupler 33, the power divider 46 and the amplifier 54. The function of the LO generation circuit is to generate and distribute a fundamental signal of about 9.5 GHz is generated by the negative resistance oscillator device 32. In particular, the fixed tune oscillator 32 generates the fundamental signal at about 9.5 GHz ($f_o$=9.5 GHz). It is appreciated that appropriate selection of resonator circuitry in the oscillator 32 will yield a desired fundamental signal for the LO generation covering the entire E-Band. It is further appreciated that the primary LO signal frequency of the present invention may vary from application to application.

After the LO signal is generated in oscillator 32, the LO signal is routed directly to the buffering amplifier 34 (8–12 GHz range) where the LO signal is amplified to about +10 dBm. The signal is then directed to amplifier 40 in the second MMIC device 7. Moreover, the fundamental signal is coupled after the source (oscillator 32) at directional coupler 33 which is positioned between oscillator 32 and amplifier 34. The coupler 33 samples the main signal and produces a similar signal at a lower power level. The coupler 33 may be implemented via, for example, distributed transmission line elements. In an alternative approach, an LO signal may be directly split from the oscillator 32. The LO signal sampled from the fundamental signal generated by oscillator 32 is then fed into a power divider 46 to drive the LO in the second downconversion to baseband. In particular, a first LO signal output from the power divider 46 is fed into buffering amplifier 54 (8–12 GHz range) where it is amplified to a nominal power level of about +10 dBm. Also, the second LO signal from the power divider 46 is routed to a phase locked loop circuit (56, 58, 60) to provide a signal for phase locking. The phase locked loop circuit will be discussed later in the specification.

The second downconversion circuit (or IF circuit) includes amplifier 48, the low pass filter 50, and mixer 52. In particular, an intermediate frequency (IF) signal in a range of about 8–12 GHz is received from singly balanced sub-harmonic mixer 25 of the first MMIC device 5 to the amplifier 48 where the power of the signal is amplified to a nominal power level about +10 dBm. The received IF signal is then passed through the low pass filter 50 where undesired products, mixer terms and/or LO leakage above the IF band may be filtered out. Then the filtered IF signal still at 8–12 GHz range is fed into the mixer 52 and combined with the LO signal output from the buffering amplifier 54. The mixer 52, then downconverts the combined signal to baseband, wherein a resulting output data signal 62 is produced and communicated to another device, such a modem.

Third Exemplary Embodiment of the Present Invention

Figure 3:
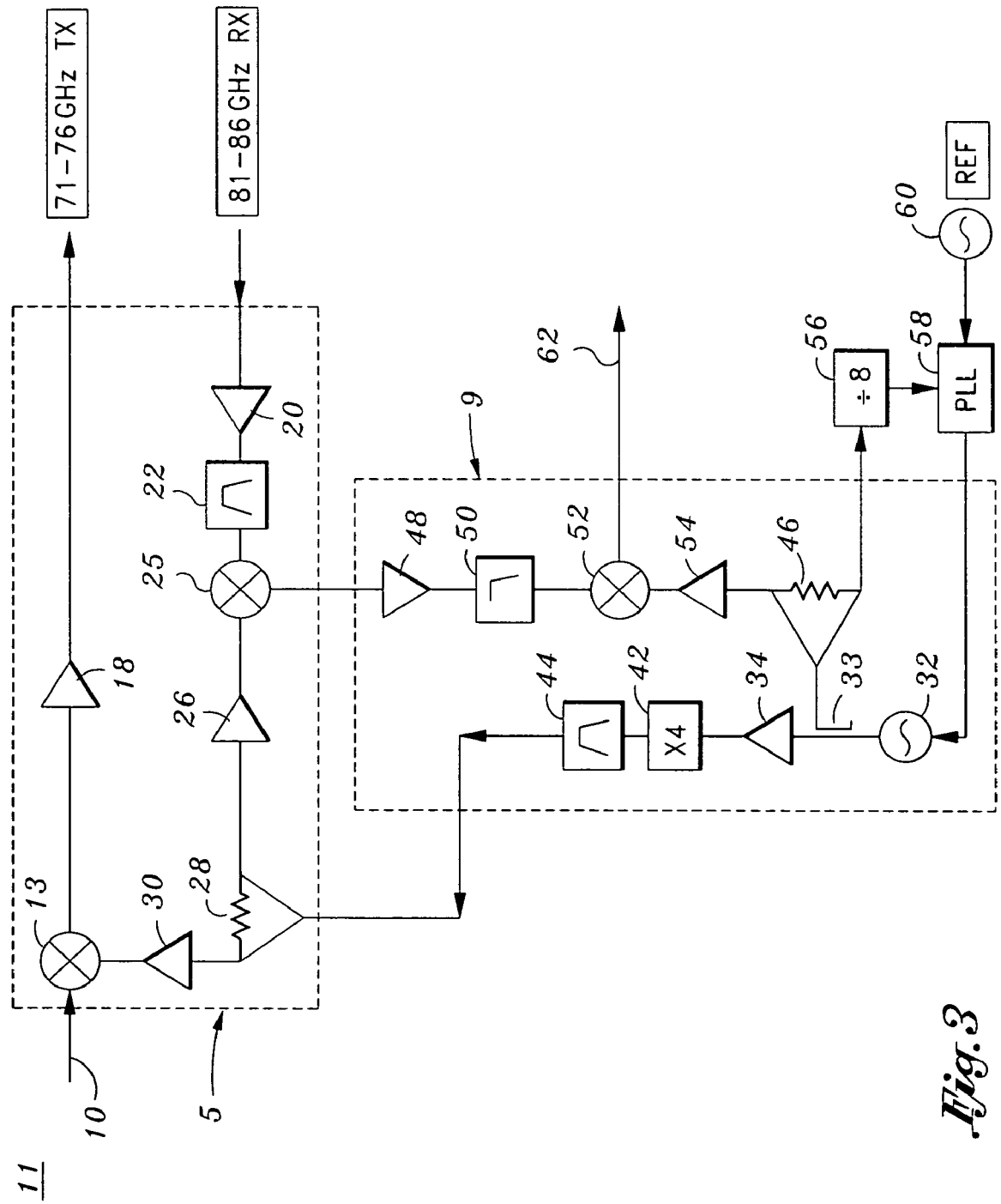
FIG. 3 is a circuit diagram of a third exemplary E-Band radio transceiver front-end, according to an aspect of the present invention.

According to a third exemplary embodiment of the present invention, a MMIC-based radio front-end and architecture thereof for E-Band applications which comprises a chip set 11 including two MMIC devices 5, 9 is disclosed as the circuit depicted in FIG. 3. The third embodiment of the present invention is similar to that of the second embodiment in that it employs a sub-harmonic mixing scheme by eliminating a multiplier circuit in the multiplier chain chip 7 (see second MMIC device 7 from FIG. 2), and by furthermore, utilizing singly balanced sub-harmonic mixers in the transmitter and receiver chip 5 (or first MMIC device 5).

In particular, in the third exemplary embodiment of the present invention, the X4 multiplier and bandpass filter 44 are integrated onto a second MMIC device 9, while the amplifier function 40 is combined with buffering amplifier 34 also on the second MMIC device 9. As a result, the second MMIC device 7 from the second embodiment may be completely eliminated. Moreover, the transmission amplifiers 14, 16 from the first MMIC device 5 are also combined into one transmission amplifier 18.

A benefit of the third embodiment is that the E-Band transmitter front-end chip set 11 is further simplified, it consumes less power, is flexible, is less complex to manufacture, and is less expensive to produce as compared to the E-Band transmitter front-end chip set 3 (from second embodiment; FIG. 2). Each MMIC device 5, 9 is now herein described below.

First MMIC Device (for Third Embodiment): Transmitter and Receiver Chip

A first exemplary MMIC device 5 is [also referred to as the transmitter (TX) and receiver (RX) chip] is provided which includes as many as eight circuit functions on a single chip, including a singly balanced sub-harmonic mixer 13 (or modulator), transmission amplifier 18, amplifier 20, bandpass filter 22, singly balanced sub-harmonic mixer 25 (or modulator), amplifier 26, power divider 28, and amplifier 30. The MMIC device includes three circuits, including a transmission circuit (13, 18), a receiver circuit (20, 22, 25), and a local oscillator (LO) circuit (26, 28, 30).

The transmitter section includes the singly balanced sub-harmonic mixer 13, and transmission amplifier 18. With regard to the transmission function, input data signal equal to RF+2LO from a source 10, such as modem, is received into the mixer 13. Additionally, an LO signal equal to about half the desired E-Band transmission frequency (for instance between about 35–45 GHz) is received into the mixer 13. The mixer 13 then upconverts the modulated baseband signal RF+2LO directly to a frequency equal to the desired E-Band transmission frequency. The modulated E-Band signal power is amplified by transmission amplifier 18 having nominally about 100 mW (or about +20 dBm) of continuous wave (CW) output power. After amplification, the signal may be then transmitted in at least one of the four separate 1.25 GHz channels defined between 71–76 GHz.

The receiver circuit (or receiver chain) may include a low noise amplifier (LNA) 20, band pass filter 22, and singularly balanced sub-harmonic mixer 25. With regard to the receiver function, signals are initially received over at least one of the four separate 1.25 GHz channels defined between frequency range 81–86 GHz. In receiving the corresponding band, low noise amplifier 20 and band pass filter 22 add selective gain and reduce image noise from the received signal before it is routed into the mixer 25. Furthermore, the LNA 20 sets noise figure for the receiving chain, provides selectivity, and increases sensitivity as well. Moreover, LNA 20 helps to isolate LO from the antenna (not shown).

The LO circuit includes power divider 28, and amplifiers 26 and 30. It is initially noted that divider 28, and amplifiers 26 and 30 operate at half the desired E-Band frequencies. In particular, a LO signal raised to half the desired E-Band frequency is received into the power divider 28 and split. The power divider 28 preferably is a Wilkenson-type power divider. Amplifier 30, which is downstream one output of the power divider 28, receives an LO signal at about −10 dBm and amplifies the LO signal to a nominal range of about +10 to +15 dBm. After amplification in amplifier 30, the split LO signal is received into the singly balanced sub-harmonic mixer 13 to upconvert the modulated baseband signal RF+2LO directly to a frequency equal to the desired E-Band transmission frequency. Additionally, amplifier 26, which is downstream the other output of the power divider 28, receives an LO signal at about −10 dBm and amplifies the LO signal to a nominal range of about +10 to +15 dBm. After amplification in amplifier 26, singly balanced sub-harmonic mixer 25 then performs downconversion to an intermediate frequency (IF). It is further appreciated that the amplification function performed by either amplifier 30 and/or amplifier 26 may also be accomplished with a chain or plurality of amplifiers (such as a pair).

Second MMIC Device (for Third Embodiment): Multiplier Chain, LO Generation and Second Downconversion The second MMIC device 9 is similar to the first and second embodiment's MMIC device 8, except that it also includes X4 multiplier 42 and bandpass filter 44 (from the second MMIC device 7 of FIG. 2 of the second embodiment). The second MMIC device 9 may have ten functions on a single chip including a negative resistance fixed tuned oscillator device 32, a directional coupler 33, buffering amplifier 34, X4 multiplier 42, bandpass filter 44, power divider 46, buffering amplifier 54, mixer (or modulator) 52, low pass filter 50, and amplifier 48. Preferably, a p-HEMT process is used to keep the chip set common to a single process technology. The second MMIC device 9 includes a multiplier chain, LO generation circuit and a second downconversion circuit (or intermediate frequency IF circuit).

The LO generation circuit includes the fixed tuned local oscillation generation device 32, the directional coupler 33, the power divider 46 and the amplifier 54. The function of the LO generation circuit is to generate and distribute a fundamental signal which is generated by the negative resistance oscillator device 32. In particular, the fixed tune oscillator 32 generates the fundamental signal at about 9.5 GHz ($f_o$=9.5 GHz). It is appreciated that appropriate selection of resonator circuitry in the oscillator 32 will yield a desired fundamental signal for the LO generation covering the entire E-Band. It is further appreciated that the primary LO signal frequency of the present invention may vary from application to application.

After the LO signal is generated in oscillator 32, the LO signal is then directed to the multiplier chain which includes amplifier 34, X4 multiplier 42, and bandpass filter 42. The function of the second MMIC device 7 from the second embodiment is accomplished in the multiplier chain 34, 42, 44 which is to multiply the local oscillator signal to the half desired frequency in E-Band. The LO signal is then routed to the power divider 28 of MMIC device 5 where the signal is split to drive both the transmitter and receiver circuits of the first MMIC device 5.

In particular, an LO signal from amplifier 34 of the second MMIC device 9 is received into the X4 multiplier. Preferably, the power of the signal from amplifier 34 is at a nominal range of about +10 dBm. The LO signal generated from amplifier 34 should be sufficient enough to drive the X4 multiplier 42. Once the LO signal is received into the X4 multiplier 42, it is multiplied by a factor of four. Thus, since the signal is received before the X4 multiplier 42 at about 10 GHz, the signal will be incrementally quadrupled to about 40 GHz. The LO signal is then filtered in bandpass filter 44, wherein undesired multiplier products of about 10 GHz are removed. Thus, for instance undesired products of about 10 GHz, 20 GHz and 30 GHz may be removed in filter 44. Finally, the LO signal is sent to the power divider 28 in the first MMIC device 5.

Additionally, the fundamental signal is coupled from the source (oscillator 32) at directional coupler 33 which is positioned between oscillator 32 and amplifier 34. The coupler 33 samples the main signal and produces a similar signal at a lower power level. The coupler 33 may be implemented, via for example, distributed transmission line elements. In an alternative approach, an LO signal may be directly split from the oscillator 32. The LO signal sampled from the fundamental signal generated by oscillator 32 is then fed into a power divider 46 to drive the LO in the second downconversion to baseband. In particular, a first LO signal output from the power divider 46 is fed into buffering amplifier 54 (8–12 GHz range) where it is amplified to a nominal power level of about +10 dBm. Also, the second LO signal from the power divider 46 is routed to a phase locked loop circuit (56, 58, 60) to provide a signal for phase locking. The phase locked loop circuit will be discussed later in the specification.

The second downconversion circuit (or IF circuit) includes amplifier 48, the low pass filter 50, and mixer 52. In particular, an intermediate frequency (IF) signal in a range of about 8–12 GHz is received from singly balanced subharmonic mixer 25 of the first MMIC device 5 to the amplifier 48 where the power of the signal is amplified to a nominal power level of about +10 dBm. The received IF signal is then passed through the low pass filter 50 where undesired products, mixer terms and/or LO leakage above the IF band may be filtered out. Then the filtered IF signal still at 8–12 GHz range is fed into the mixer 52 and combined with the LO signal output from the buffering amplifier 54. The mixer 52 then downconverts the combined signal to baseband, wherein a resulting output data signal 62 is produced and to another device, such a modem.

Additional Features and Aspects of the Present Invention

Phase Lock Loop

Additionally, a phase locked loop (PLL) circuit comprising an oscillator 60, phase locked loop (PLL) device 58, and X1/8 multiplier 56 (or X8 divider) may be provided in combination with the present invention, as depicted in FIGS. 1–3. The phase lock loop circuit is utilized to add short-term and long-term stability to the E-Band transceiver chip set. The PLL device 58 may utilize a phase detector that provides a DC offset to tune the fixed tuned oscillator. The phase locked loop (PLL) operates on principles known in the art, and therefore, detailed discussion of this feature is omitted.

Full-Duplex Transmission and Receiving Scheme

Figure 4:
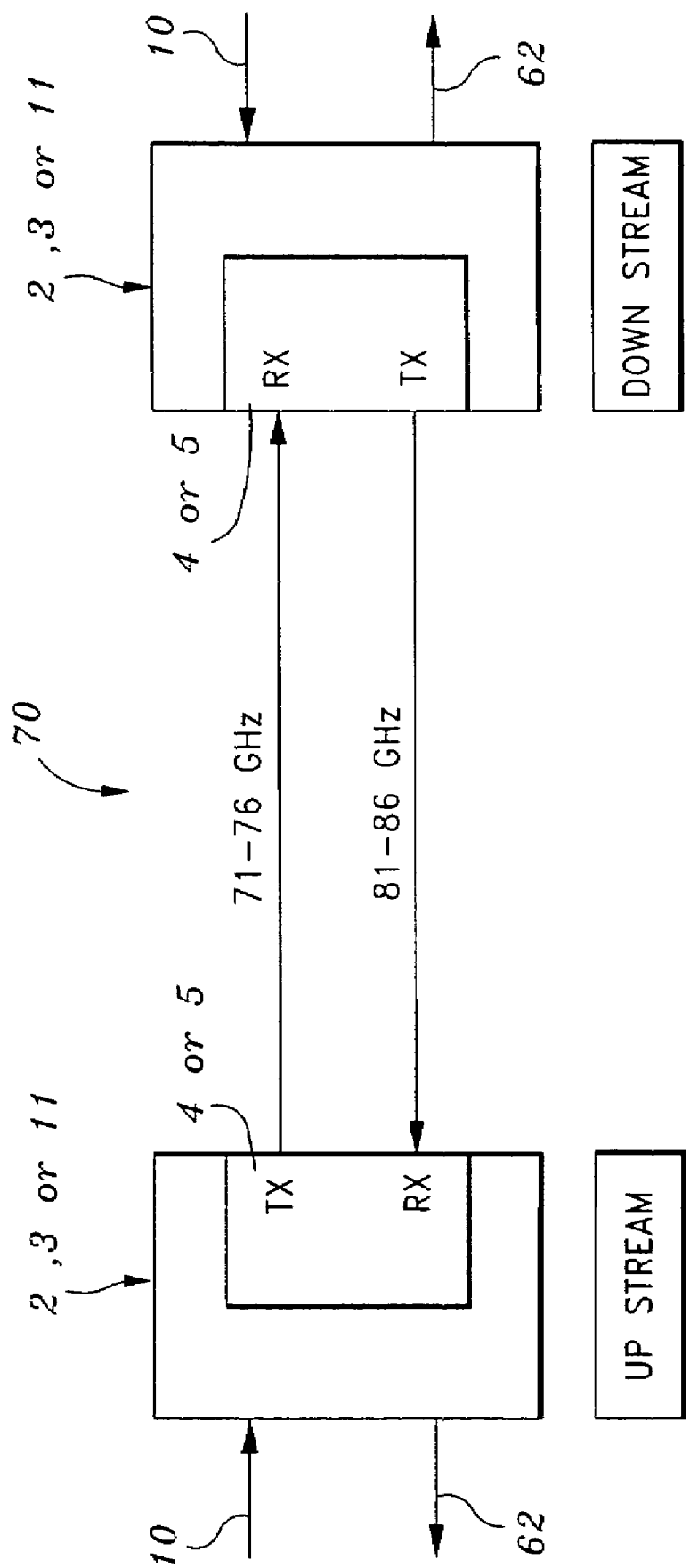
FIG. 4 depicts a pair of the exemplary E-Band radio transceiver front-ends in communication with each other.

FIG. 4 depicts a pair of the E-Band front-end transceivers 2, 3, or 11 communicating between each other via a wireless link 70 which utilizes a full-duplex transmission scheme. When the upstream transceiver transmits in a certain E-Band frequency range, such as 71–76 GHz, the downstream transceiver is configured to receive in the same E-Band frequency range. Thus, the upstream node and downstream node form a "dual" radio link in terms of frequency. The same duality applies when the downstream node transmits back at 81–86 GHz and the upstream node receives at 81–86 GHz. In other words, the RX and TX bands at the opposite end of the radio link are flipped.

Exemplary E-Band Communications System

Figure 5:
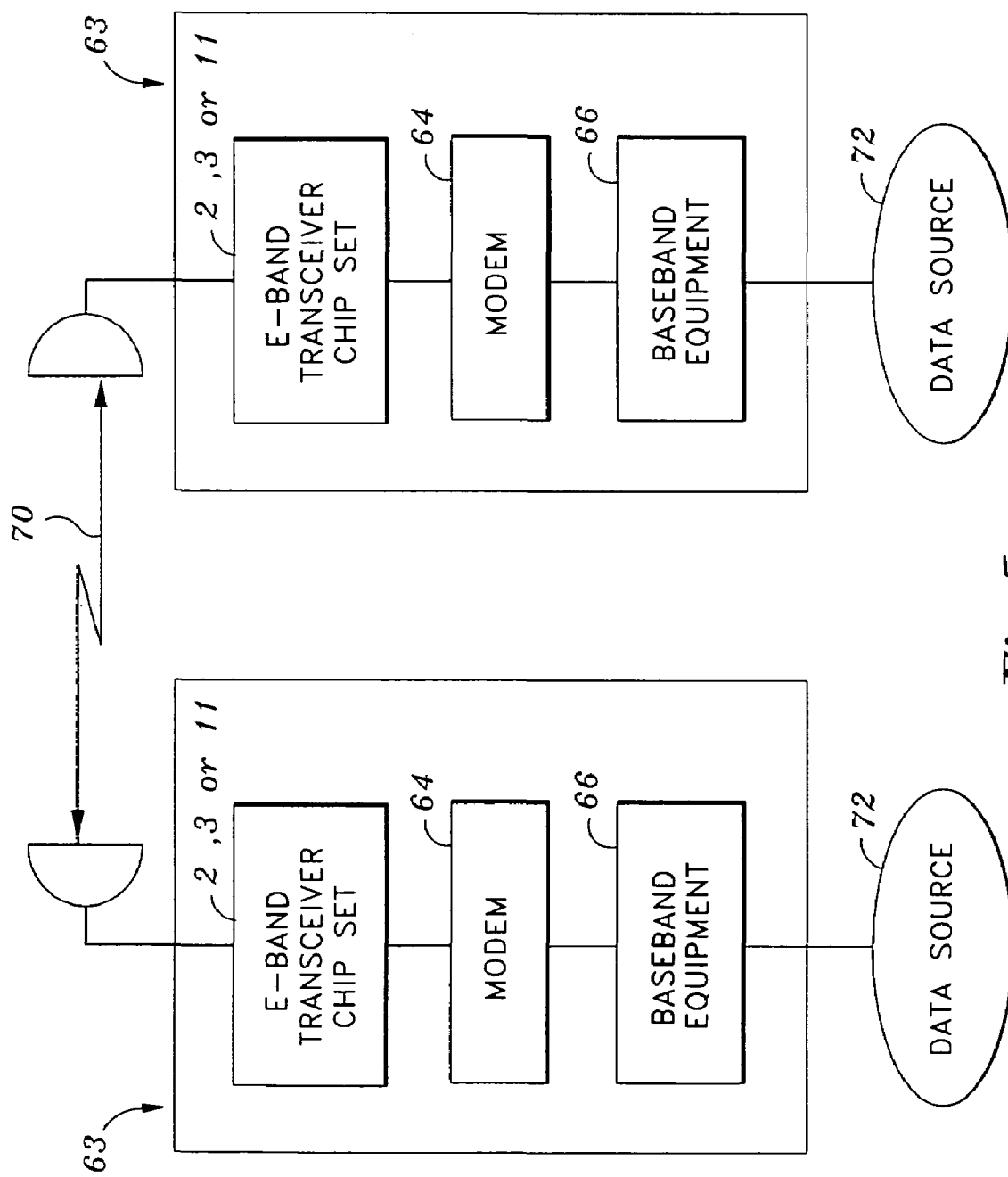
FIG. 5 depicts an exemplary E-Band communications system, according to an aspect of the present invention.

FIG. 5 depicts an exemplary E-Band communications system, according to an aspect of the present invention. In more particularity, the exemplary E-Band communications system may be a point-to-point system which utilizes a pair of E-Band communication system nodes or stations 63 to transmit and receive data via E-Band frequencies over a wireless link 70. Each station 63 comprises at least one of the embodiments of the E-Band transceiver chip set 2, 3, or 11. Each station 63 may further include a modem 64 and baseband equipment 66 utilized to support various system functions. Furthermore, each station is in communication with a data source 72.

Moreover, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A MMIC-based E-Band transceiver front-end comprising:
    a first MMIC device comprising,
        a transmission circuit for receiving a data stream input at a baseband frequency, mixing the data stream with an LO signal having an E-Band frequency, and transmitting a resultant data stream at an upconverted E-Band frequency;
        a receiver circuit for receiving a data stream having an E-Band frequency, mixing the received data stream with an LO signal having an E-Band frequency, and downconverting the resultant mixed received signal to an intermediate frequency (IF); and
        an LO signal circuit for dividing a received LO signal at an E-Band frequency and communicating the LO signal to said transmission and receiver circuits;
    a second MMIC device comprising a multiplier circuit for receiving an LO signal at a reference frequency, and multiplying the LO signal to an E-Band frequency;
    a third MMIC device comprising,
        a second downconversion circuit for mixing the mixed received IF signal with an LO signal, and downconverting the resultant mixed received signal to a baseband frequency, and
        an LO generation circuit for generating an LO signal, communicating the LO signal to said second MMIC device, coupling the LO signal, dividing the coupled LO signal, and communicating the divided LO signal to the second downconversion circuit.

2. The E-Band transceiver front-end according to claim 1, wherein said first, second, and third MMIC devices are manufactured by a p-HEMT process.

3. The E-Band transceiver front-end to claim 1, wherein said first and second MMIC devices are manufactured by a p-HEMT process and said third MMIC device is manufactured by a MESFET process.

4. The E-Band transceiver front-end according to claim 1, wherein said transceiver front-end transmits and receives over three frequency ranges including 71–76 GHz, 81–86 GHz and 92–95 GHz.

5. The E-Band transceiver front-end according to claim 2, wherein said transceiver front-end transmits and receives over four 1.25 GHz channels within each of the 71–76 GHz, 81–86 GHz, and 92–95 frequency ranges.

6. The E-Band transceiver front-end according to claim 1, wherein said MMIC devices are gallium arsenide (GaAs) devices.

7. The E-Band transceiver front-end according to claim 1, wherein said transceiver front-end is adapted to communicate with another transceiver front-end in a full-duplex scheme.

8. The E-Band transceiver front-end according to claim 1, wherein said transmission circuit includes a fundamental mixer and at least one amplifier downstream of said mixer.

9. The E-Band transceiver front-end according to claim 1, wherein said receiving circuit includes a low noise amplifier, a bandpass filter downstream said low noise amplifier, and a fundamental mixer downstream said low noise amplifier.

10. The E-Band transceiver front-end according to claim 1, wherein said LO signal circuit comprises a power divider and at least one amplifier downstream each output of said divider.

11. The E-Band transceiver front-end according to claim 1, wherein said multiplier circuit comprises an X2 multiplier, a first bandpass filter downstream said X2 multiplier, a circuit amplifier downstream said first bandpass filter, a X4 multiplier downstream of said multiplier circuit amplifier, and a multiplier circuit bandpass filter downstream of said X4 multiplier.

12. The E-Band transceiver front-end according to claim 1, said second downconversion circuit comprises at least one amplifier, a low pass filter downstream of said at least one amplifier, and a mixer downstream of said low pass filter.

13. The E-Band transceiver front-end according to claim 1, wherein said LO generation circuit comprises an oscillator, at least one buffering amplifier downstream said oscillator, a coupler between said oscillator and said at least one buffering amplifier, a power divider downstream of said coupler, and a second amplifier downstream an output of said power divider.

14. The E-Band transceiver front-end according to claim 1, wherein a sub-harmonic mixing scheme is utilized.

15. The E-Band transceiver front-end according to claim 14, said wherein said transmission circuit and said receiver circuit each utilize singly balanced sub-harmonic mixers.

16. The E-Band transceiver front-end according to claim 15, wherein said multiplier circuit comprises a circuit amplifier, a X4 multiplier downstream of said multiplier circuit amplifier, and a multiplier circuit bandpass filter downstream of said X4 multiplier.

17. A MMIC-based E-Band transceiver front-end comprising:
a first MMIC device comprising,
a transmission circuit comprising a fundamental transmission mixer, at least one transmission amplifier downstream said transmission mixer, wherein a data steam is input into said transmission mixer, and wherein an output from said at least one amplifier is transmitted;
a receiver circuit comprising a low noise amplifier, a receiver bandpass filter downstream said low noise amplifier, and a fundamental receiver mixer, wherein a received signal is communicated to an input of said low noise amplifier, and wherein an output of said receiver mixer is communicated to a third MMIC device; and
an LO signal circuit comprising a power divider, a transmission LO amplifier in communication with a first output of said power divider, and a receiver LO amplifier in communication with a second output of said power divider, wherein an output of said transmission LO amplifier is communicated to an input of said transmission mixer, and an output of said receiver LO amplifier is communicated to an input of said receiver mixer;
a second MMIC device comprising a multiplier circuit comprising an X2 multiplier, a first multiplier circuit bandpass filter downstream of said X2 multiplier, a multiplier circuit amplifier downstream of said first multiplier circuit bandpass filter, a X4 multiplier downstream of multiplier circuit amplifier, and a second multiplier circuit bandpass filter downstream of said X4 multiplier, wherein an output of said X4 multiplier is communicated to an input of said power divider of said first MMIC device;
said third MMIC device comprising,
an IF circuit comprising an IF amplifier, a low pass filter downstream of said IF amplifier, and a baseband mixer downstream of said low pass filter, wherein an output of said receiver mixer from said first MMIC device is communicated to an input of said IF amplifier, and wherein said baseband mixer provides an output data stream; and
an LO generation circuit comprising a fixed tuned oscillator, a first buffering amplifier downstream of said fixed tuned oscillator, a coupler between said fixed tuned oscillator and said first buffering amplifier, a third MMIC device power divider downstream of said coupler, and a second buffering amplifier downstream of a first output of said third MMIC device power divider, wherein an output from said first buffering amplifier is communicated to an input of said X2 multiplier of said second MMIC device.

18. The E-Band transceiver front-end according to claim 17, further comprising a phase lock loop circuit comprising a X1/8 multiplier, a phase lock loop device downstream of said X1/8 multiplier, and a reference signal oscillator which supplies a reference signal to an input of said phase lock loop device, wherein an output of said phase lock loop device is in communication with an input of said fixed tune oscillator of said third MMIC device, and wherein said X1/8 multiplier is in communication with a second output of said third device power divider from said third MMIC device.

19. The E-Band transceiver front-end according to claim 17, wherein said at least one transmission amplifier comprises a first and second transmission amplifier in series.

20. The E-Band transceiver front-end according to claim 17, wherein said first, second, and third MMIC devices are manufactured by a p-HEMT process.

21. The E-Band transceiver front-end to claim 17, wherein said first and second MMIC devices are manufactured by a p-HEMT process and said third MMIC device is manufactured by a MESFET process.

22. The E-Band transceiver front-end according to claim 17, wherein said transceiver front-end transmits and receives over three frequency ranges including 71–76 GHz, 81–86 GHz and 92–95 GHz.

23. The E-Band transceiver front-end according to claim 22, wherein said transceiver front-end transmits and receives over four 1.25 GHz channels within each of the 71–76 GHz, 81–86 GHz, and 92–95 frequency ranges.

24. The E-Band transceiver front-end according to claim 17, wherein said MMIC devices are gallium arsenide (GaAs) devices.

25. The E-Band transceiver front-end according to claim 17, wherein said transceiver front-end is adapted to communicate with another transceiver front-end in a full-duplex scheme.

26. A MMIC-based E-Band transceiver front-end comprising:
a first MMIC device comprising,
a transmission circuit comprising a sub-harmonic transmission mixer, at least one transmission amplifier downstream said transmission mixer, wherein a data steam is input into said transmission mixer, and wherein an output from said at least one amplifier is transmitted;
a receiver circuit comprising a low noise amplifier, a receiver bandpass filter downstream said low noise amplifier, and a sub-harmonic receiver mixer, wherein a received signal is communicated to an input of said low noise amplifier, and wherein an output of said receiver mixer is communicated to a third MMIC device; and
an LO signal circuit comprising a power divider, a transmission LO amplifier in communication with a first output of said power divider, and a receiver LO amplifier in communication with a second output of said power divider, wherein an output of said transmission LO amplifier is communicated to an input of said transmission mixer, and an output of said receiver LO amplifier is communicated to an input of said receiver mixer;
a second MMIC device comprising a multiplier circuit comprising a multiplier circuit amplifier, a X4 multiplier downstream of said multiplier circuit amplifier, and a multiplier circuit bandpass filter downstream of said X4 multiplier, wherein an output of said multiplier circuit bandpass filter is communicated to an input of said power divider of said first MMIC device; and
said third MMIC device comprising,
an IF circuit comprising an IF amplifier, a low pass filter downstream of said IF amplifier, and a baseband mixer downstream of said low pass filter, wherein an output of said receiver mixer from said first MMIC device is communicated to an input of said IF amplifier, and wherein said baseband mixer provides an output data stream; and
an LO generation circuit comprising a fixed tuned oscillator, a first buffering amplifier downstream of said fixed tuned oscillator, a coupler between said fixed tuned oscillator and said first buffering amplifier, a third MMIC device power divider downstream of said coupler, and a second buffering amplifier downstream of a first output of said third MMIC device power divider, wherein an output from said first buffering amplifier is communicated to an input of said multiplier circuit amplifier of said second MMIC device.

27. The E-Band transceiver front-end according to claim 26, further comprising a phase lock loop circuit comprising a X1/8 multiplier, a phase lock loop device downstream of said X1/8 multiplier, and a reference signal oscillator which supplies a reference signal to an input of said phase lock loop device, wherein an output of said phase lock loop device is in communication with an input of said fixed tune oscillator of said third MMIC device, and wherein said X1/8 multiplier is in communication with a second output of said third MMIC device power divider.

28. The E-Band transceiver front-end according to claim 26, wherein said at least one transmission amplifier comprises a first and second transmission amplifier in series.

29. The E-Band transceiver front-end according to claim 26, wherein said first, second, and third MMIC devices are manufactured by a p-HEMT process.

30. The E-Band transceiver front-end to claim 26, wherein said first and second MMIC devices are manufactured by a p-HEMT process and said third MMIC device is manufactured by a MESFET process.

31. The E-Band transceiver front-end according to claim 26, wherein said transceiver front-end transmits and receives over three frequency ranges including 71–76 GHz, 81–86 GHz and 92–95 GHz.

32. The E-Band transceiver front-end according to claim 31, wherein said transceiver front-end transmits and receives over four 1.25 GHz channels within each of the 71–76 GHz, 81–86 GHz, and 92–95 frequency ranges.

33. The E-Band transceiver front-end according to claim 26, wherein said MMIC devices are gallium arsenide (GaAs) devices.

34. The E-Band transceiver front-end according to claim 26 wherein said transceiver front-end is adapted to communicate with another transceiver front-end in a full-duplex scheme.

35. A MMIC-based E-Band transceiver front-end consisting:
a first MMIC device consisting,
a transmission circuit consisting of a sub-harmonic transmission mixer, and a transmission amplifier downstream said transmission mixer, wherein a data steam is input into said transmission mixer, and wherein an output from said at least one amplifier is transmitted;
a receiver circuit consisting of a low noise amplifier, a receiver bandpass filter downstream said low noise amplifier, and a sub-harmonic receiver mixer, wherein a received signal is communicated to an input of said low noise amplifier, and wherein an output of said receiver mixer is communicated to a second MMIC device; and
an LO signal circuit consisting of a power divider, a transmission LO amplifier in communication with a first output of said power divider, and a receiver LO amplifier in communication with a second output of said power divider, wherein an output of said transmission LO amplifier is communicated to an input of said transmission mixer, and an output of said receiver LO amplifier is communicated to an input of said receiver mixer; and
a second MMIC device consisting,
a multiplier circuit consisting of a first buffering amplifier, an X4 multiplier downstream of said first buffering amplifier, and a multiplier circuit bandpass filter downstream of said X4 multiplier, wherein an output of said multiplier circuit bandpass filter is communicated to an input of said power divider of said first MMIC device;

an IF circuit consisting of an IF amplifier, a low pass filter downstream of said IF amplifier, and a baseband mixer downstream of said low pass filter, wherein an output of said receiver mixer from said first MMIC device is communicated to an input of said IF amplifier, and wherein said baseband mixer provides an output data stream; and an LO generation circuit consisting of a fixed tuned oscillator having an output in communication with an input of said first buffering amplifier of said multiplier circuit, a coupler between said fixed tuned oscillator and said first buffering amplifier, a second MMIC device power divider downstream of said coupler, and a second buffering amplifier downstream of a first output of said second MMIC device power divider.

36. The E-Band transceiver front-end according to claim 35, further comprising a phase lock loop circuit comprising a X1/8 multiplier, a phase lock loop device downstream of said X1/8 multiplier, and a reference signal oscillator which supplies a reference signal to an input of said phase lock loop device, wherein an output of said phase lock loop device is in communication with an input of said fixed tune oscillator of said third MMIC device, and wherein said X1/8 multiplier is in communication with a second output of said second MMIC device power divider.

37. The E-Band transceiver front-end according to claim 35, wherein said first and second MMIC devices are manufactured by a p-HEMT process.

38. The E-Band transceiver front-end according to claim 35, wherein said transceiver front-end transmits and receives over three frequency ranges including 71–76 GHz, 81–86 GHz and 92–95 GHz.

39. The E-Band transceiver front-end according to claim 38, wherein said transceiver front-end transmits and receives over four 1.25 GHz channels within each of the 71–76 GHz, 81–86 GHz, and 92–95 frequency ranges.

40. The E-Band transceiver front-end according to claim 35, wherein said MMIC devices are gallium arsenide (GaAs) devices.

41. The E-Band transceiver front-end according to claim 35, wherein said transceiver front-end is adapted to communicate with another transceiver front-end in a full-duplex scheme.

42. A MMIC device comprising:
a transmission circuit comprising a fundamental transmission mixer, at least one transmission amplifier downstream said transmission mixer, wherein a data steam is input into said transmission mixer, and wherein an output from said at least one amplifier is transmitted;

a receiver circuit comprising a low noise amplifier, a receiver bandpass filter downstream said low noise amplifier, and a fundamental receiver mixer, wherein a received signal is communicated to an input of said low noise amplifier; and an LO signal circuit comprising a power divider, a transmission LO amplifier downstream and in communication with a first output of said power divider, and a receiver LO amplifier downstream and in communication with a second output of said power divider, wherein an output of said transmission LO amplifier is communicated to an input of said transmission mixer, and an output of said receiver LO amplifier is communicated to an input of said receiver mixer.

43. A MMIC device comprising:
a multiplier circuit comprising an X2 multiplier, a first multiplier circuit bandpass filter downstream of said X2 multiplier, a multiplier circuit amplifier downstream of said first multiplier circuit bandpass filter, a X4 multiplier downstream of multiplier circuit amplifier, and a second multiplier circuit bandpass filter downstream of said X4 multiplier.

44. A MMIC device comprising:
an IF circuit comprising an IF amplifier, a low pass filter downstream of said IF amplifier, and a baseband mixer downstream of said low pass filter, wherein an output of said receiver mixer from said first MMIC device is communicated to an input of said IF amplifier, and wherein said baseband mixer provides an output data stream; and an LO generation circuit comprising a fixed tuned oscillator, a first buffering amplifier downstream of said fixed tuned oscillator, a coupler between said fixed tuned oscillator and said first buffering amplifier, a third MMIC device power divider downstream of said coupler, and a second buffering amplifier downstream of a first output of said third MMIC device power divider.

45. A MMIC device comprising:
a transmission circuit comprising a sub-harmonic transmission mixer, at least one transmission amplifier downstream said transmission mixer, wherein a data stream is input into said transmission mixer, and wherein an output from said at least one amplifier is transmitted;

a receiver circuit comprising a low noise amplifier, a receiver bandpass filter downstream said low noise amplifier, and a sub-harmonic receiver mixer, wherein a received signal is communicated to an input of said low noise amplifier; and an LO signal circuit comprising a power divider, a transmission LO amplifier downstream and in communication with a first output of said power divider, and a receiver LO amplifier downstream and in communication with a second output of said power divider, wherein an output of said transmission LO amplifier is communicated to an input of said transmission mixer, and an output of said receiver LO amplifier is communicated to an input of said receiver mixer.

46. A MMIC device comprising:
a multiplier circuit comprising a first buffering amplifier, an X4 multiplier downstream of said first buffering amplifier, and a multiplier circuit bandpass filter downstream of said X4 multiplier;

an IF circuit comprising an IF amplifier, a low pass filter downstream of said IF amplifier, and a baseband mixer downstream of said low pass filter, wherein an output of said receiver mixer from said first MMIC device is communicated to an input of said IF amplifier, and wherein said baseband mixer provides an output data stream; and an LO generation circuit comprising a fixed tuned oscillator having an output in communication with an input of said first buffering amplifier of said multiplier circuit, a coupler between said fixed tuned oscillator and said first buffering amplifier, a second MMIC device power divider downstream of said coupler, and a second buffering amplifier downstream of a first output of said second MMIC device power divider.

47. An E-Band communications system comprising a plurality of E-Band stations adapted to communicate with each other, each station comprising a MMIC-based E-Band transceiver front-end, a modem, baseband equipment, and a data source, said MMIC-based E-Band transceiver front-end comprising:
    a first MMIC device comprising,
        a transmission circuit for receiving a data stream input at a baseband frequency, mixing the data stream with an LO signal having an E-Band frequency, and transmitting a resultant data stream at an upconverted E-Band frequency;
        a receiver circuit for receiving a data stream having an E-Band frequency, mixing the received data stream with an LO signal having an E-Band frequency, and downconverting the resultant mixed received signal to an intermediate frequency (IF); and
        an LO signal circuit for dividing a received LO signal at an E-Band frequency and communicating the LO signal to said transmission and receiver circuits;
    a second MMIC device comprising a multiplier circuit for receiving an LO signal at a reference frequency, and multiplying the LO signal to an E-Band frequency;
    a third MMIC device comprising,
        a second downconversion circuit for mixing the mixed received IF signal with an LO signal, and downconverting the resultant mixed received signal to a baseband frequency, and
        an LO generation circuit for generating an LO signal, communicating the LO signal to said second MMIC device, coupling the LO signal, dividing the coupled LO signal, and communicating the divided LO signal to the second downconversion circuit.

48. The E-Band communications system according to claim 47, wherein said first, second, and third MMIC devices are manufactured by a p-HEMT process.

49. The E-Band communications system according to claim 48, wherein said transceiver front-end transmits and receives over four 1.25 GHz channels within each of the 71–76 GHz, 81–86 GHz, and 92–95 frequency ranges.

50. The E-Band communications system according to claim 48, wherein said LO generation circuit comprises an oscillator, at least one buffering amplifier downstream said oscillator, a coupler between said oscillator and said at least one buffering amplifier, a power divider downstream of said coupler, and a second amplifier downstream an output of said power divider.

51. The E-Band communications system according to claim 47, wherein said first and second MMIC devices are manufactured by a p-HEMT process and said third MMIC device is manufactured by a MESFET process.

52. The E-Band communications system according to claim 47, wherein said transceiver front-end transmits and receives over three frequency ranges including 71–76 GHz, 81–86 GHz and 92–95 GHz.

53. The E-Band communications system according to claim 47, wherein said MMIC devices are gallium arsenide (GaAs) devices.

54. The E-Band communications system according to claim 47, wherein said transceiver front-end is adapted to communicate with another transceiver front-end in a full-duplex scheme.

55. The E-Band communications system according to claim 47, wherein said transmission circuit includes a fundamental mixer and at least one amplifier downstream of said mixer.

56. The E-Band communications system according to claim 47, wherein said receiving circuit includes a low noise amplifier, a bandpass filter downstream said low noise amplifier, and a fundamental mixer downstream said low noise amplifier.

57. The E-Band communications system according to claim 47, wherein said LO signal circuit comprises a power divider and at least one amplifier downstream each output of said divider.

58. The E-Band communications system according to claim 47, wherein said multiplier circuit comprises an X2 multiplier, a first bandpass filter downstream said X2 multiplier, a circuit amplifier downstream said first bandpass filter, a X4 multiplier downstream of said multiplier circuit amplifier, and a multiplier circuit bandpass filter downstream of said X4 multiplier.

59. The E-Band communications system according to claim 47, said second downconversion circuit comprises at least one amplifier, a low pass filter downstream of said at least one amplifier, and a mixer downstream of said low pass filter.

60. The E-Band communications system according to claim 47, wherein a sub-harmonic mixing scheme is utilized.

61. The E-Band communications system according to claim 60, said wherein said transmission circuit and said receiver circuit each utilize singly balanced sub-harmonic mixers.

62. The E-Band communications system according to claim 61, wherein said multiplier circuit comprises a circuit amplifier, a X4 multiplier downstream of said multiplier circuit amplifier, and a multiplier circuit bandpass filter downstream of said X4 multiplier.

63. The E-Band communications system according to claim 47, wherein said system implements a point-to-point topology.

* * * * *